United States Patent
Hayakawa et al.

(10) Patent No.: US 11,345,357 B2
(45) Date of Patent: May 31, 2022

(54) FAILURE DIAGNOSTIC SYSTEM

(71) Applicant: SUBARU CORPORATION, Tokyo (JP)

(72) Inventors: Masahito Hayakawa, Tokyo (JP); Iwao Murata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 324 days.

(21) Appl. No.: 16/673,287

(22) Filed: Nov. 4, 2019

(65) Prior Publication Data

US 2020/0180651 A1 Jun. 11, 2020

(30) Foreign Application Priority Data

Dec. 10, 2018 (JP) .............................. JP2018-230507

(51) Int. Cl.
| | |
|---|---|
| *B60W 50/00* | (2006.01) |
| *B60W 50/02* | (2012.01) |
| *B60W 50/04* | (2006.01) |
| *G07C 5/08* | (2006.01) |

(52) U.S. Cl.
CPC ...... *B60W 50/0205* (2013.01); *B60W 50/045* (2013.01); *G07C 5/0808* (2013.01); *B60W 2050/0037* (2013.01)

(58) Field of Classification Search
CPC ...... B60W 50/0205; B60W 2050/0037; G07C 5/0808

See application file for complete search history.

(56) References Cited

U.S. PATENT DOCUMENTS

| | | | | |
|---|---|---|---|---|
| 2007/0043539 A1* | 2/2007 | Niina | ................. | G05B 23/0254 |
| | | | | 702/188 |
| 2010/0168955 A1 | 7/2010 | Takeda | | |

FOREIGN PATENT DOCUMENTS

| | | |
|---|---|---|
| JP | 11-338502 A | 12/1999 |
| JP | 2010-155487 A | 7/2010 |

OTHER PUBLICATIONS

Extended European Search Report issued in corresponding European Patent Application No. 19207619.8-1202, dated Apr. 20, 2020.

* cited by examiner

*Primary Examiner* — James M McPherson
(74) *Attorney, Agent, or Firm* — McDermott Will & Emery LLP (57) ABSTRACT

A failure diagnostic system includes an instrument and a failure diagnostic device. The instrument makes measurement of a measured value regarding behavior of a diagnosis target. The failure diagnostic device has a model of the diagnostic target and performs simulation based on the model. The failure diagnostic device offers a user a proposal for execution of a special operation on the diagnostic target, on the condition that a difference between a result of the simulation and the measured value is greater than a predetermined error range but the difference provides an insufficient basis to determine whether or not the diagnosis target has a failure. The result of the simulation is calculated with the model supplied with a same input as an input to the diagnosis target at the time of the measurement by the instrument of the measured value regarding the behavior of the diagnosis target.

18 Claims, 5 Drawing Sheets

FAILURE DIAGNOSTIC SYSTEM

CROSS-REFERENCE TO RELATED APPLICATIONS

The present application claims priority from Japanese Patent Application No. 2018-230507 filed on Dec. 10, 2018, the entire contents of which are hereby incorporated by reference.

BACKGROUND

The technology relates to failure diagnostic systems for vehicles such as aircrafts and automobiles.

There have been developed techniques of monitoring behavior of, for example, an aircraft or a vehicle, or an engine or various actuators used therein, to make a diagnosis as to whether or not they have a failure.

For example, Japanese Unexamined Patent Application Publication (JP-A) No. 2010-155487 describes a vehicle auditing apparatus configured to monitor a diagnostic device in accordance with a comparison result of a model-based simulation result and a measured value. Thus, the vehicle auditing apparatus is configured to perform, for example, a failure diagnosis on the basis of an amount of deviation in their behavior.

For example, JP-A No. H11-338502 describes an actuator failure diagnostic system including a subtractor. The subtractor obtains a difference between an output of an actuator model and a movement of a real actuator. The actuator failure diagnostic system compares the difference with a failure diagnosis criterion. In a case where the difference is equal to or smaller than the criterion, the actuator failure diagnostic system determines that the real actuator is normal. In a case where the difference is greater than the criterion, the actuator failure diagnostic system determines that the actuator is abnormal.

SUMMARY

An aspect of the technology provides a failure diagnostic system including an instrument and a failure diagnostic device. The instrument is configured to make measurement of a measured value regarding behavior of a diagnosis target. The failure diagnostic device has a model of the diagnostic target and is configured to perform simulation based on the model. The failure diagnostic device is configured to offer a user a proposal for execution of a special operation on the diagnostic target, on the condition that a difference between a result of the simulation and the measured value is greater than a predetermined error range but the difference provides an insufficient basis to determine whether or not the diagnosis target has a failure. The result of the simulation is calculated with the model supplied with a same input as an input to the diagnosis target at the time of the measurement by the instrument of the measured value regarding the behavior of the diagnosis target.

An aspect of the technology provides a failure diagnostic system including an instrument and a failure diagnostic device. The instrument is configured to make measurement of a measured value regarding behavior of a diagnosis target. The failure diagnostic device has a model of the diagnostic target and is configured to perform simulation based on the model. The failure diagnostic device is configured to offer a user a proposal for measurement of a new parameter related to the diagnosis target, on the condition that a difference between a result of the simulation and the measured value is greater than a predetermined error range but the difference provides an insufficient basis to determine whether or not the diagnosis target has a failure. The result of the simulation is calculated with the model supplied with a same input as an input to the diagnosis target at the time of the measurement by the instrument of the measured value regarding the behavior of the diagnosis target.

An aspect of the technology provides a failure diagnostic system including an instrument and circuitry. The instrument is configured to make measurement of a measured value regarding behavior of a diagnosis target. The circuitry has a model of the diagnostic target and is configured to perform simulation based on the model. The circuitry is configured to offer a user a proposal for execution of a special operation on the diagnostic target, on the condition that a difference between a result of the simulation and the measured value is greater than a predetermined error range but the difference provides an insufficient basis to determine whether or not the diagnosis target has a failure. The result of the simulation is calculated with the model supplied with a same input as an input to the diagnosis target at the time of the measurement by the instrument of the measured value regarding the behavior of the diagnosis target.

An aspect of the technology provides a failure diagnostic system including an instrument and circuitry. The instrument is configured to make measurement of a measured value regarding behavior of a diagnosis target. The circuitry has a model of the diagnostic target and is configured to perform simulation based on the model. The circuitry is configured to offer a user a proposal for measurement of a new parameter related to the diagnostic target, on the condition that a difference between a result of the simulation and the measured value is greater than a predetermined error range but the difference provides an insufficient basis to determine whether or not the diagnosis target has a failure. The result of the simulation is calculated with the model supplied with a same input as an input to the diagnosis target at the time of the measurement by the instrument of the measured value regarding the behavior of the diagnosis target.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference numerals to avoid redundant description, and elements not in direct relation to the technology may not be illustrated.

Pilots sometimes feel like their operation of a control device such as a control stick meets with a rather slow response from behavior of an airframe. But in some cases, they are not sure whether or not to determine that something has happened to, for example, a control surface or an actuator that moves the control surface.

In such cases, comparison may be made, according to the methods described in, for example, JP-A Nos. 2010-155487 and H11-338502 as mentioned above, between actual behavior of an aircraft, or a diagnosis target, based on the pilot's maneuvering and a model-based simulation result. But there are not a few cases where even such comparison is still insufficient to determine whether or not the diagnosis target has a failure.

It is desirable to provide a failure diagnostic system that makes it possible to make a failure diagnosis even in a case where a failure diagnosis based on actual behavior of a diagnosis target and a model-based simulation result is insufficient to determine whether or not the diagnosis target has a failure.

In the following description, a diagnosis target is assumed to be an aircraft, and it is assumed that a failure diagnosis is made on the basis of behavior of an airframe, e.g., an ascent and a descent, in a case where, in particular, a pilot operates a control device to cause upward and downward movements of an elevator. However, it suffices for the diagnosis target to be able to be modelized. The diagnosis target may be, for example but not limited to, a vehicle or a production factory, or various devices thereof.

Moreover, the diagnosis target may include a plurality of diagnosis targets.

Figure 1:
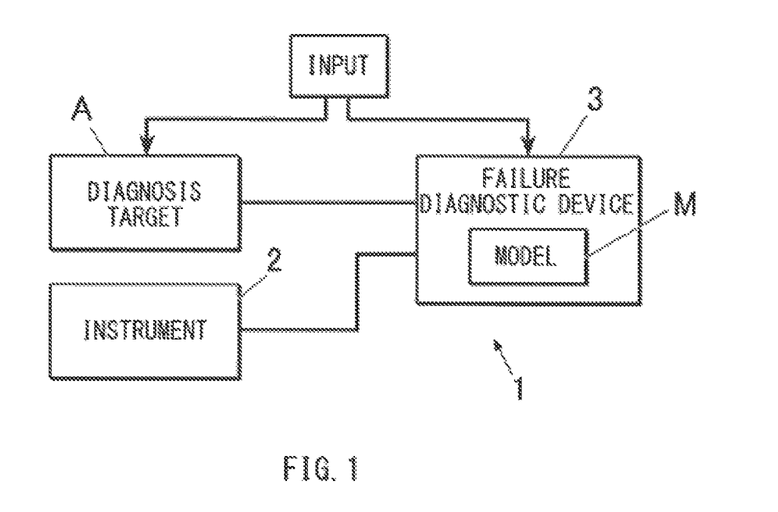
FIG. 1 is a diagram illustrating an example of a configuration of a failure diagnostic system according to an embodiment of the technology.

FIG. 1 is a diagram illustrating an example of a configuration of a failure diagnostic system according to an embodiment of the technology.

In this embodiment, a failure diagnostic system 1 may include an instrument 2 and a failure diagnostic device 3. The instrument 2 makes measurement of a measured value regarding behavior of a diagnosis target A. The failure diagnostic device 3 has a model M of the diagnosis target A and performs simulation based on the model M. The failure diagnostic system 1 makes a failure diagnosis on the basis of the measured value regarding the behavior of the diagnosis target A and a result of the simulation based on the model M.

The diagnosis target A and the failure diagnostic device 3 may be coupled directly, or through, for example, a communication network. The instrument 2 and the failure diagnostic device 3 may be coupled directly, or through, for example, a communication network.

In this embodiment, the instrument 2 and the failure diagnostic device 3 may be mounted on an aircraft as the diagnosis target A.

Though not illustrated, in the aircraft as the diagnosis target A, a control device such as a control stick and a hydraulic actuator of an elevator may be coupled through a control rope. A pilot operates the control device, causing a control valve of the hydraulic actuator to open and close, resulting in changes in hydraulic pressure of the actuator of the elevator.

The changes in the hydraulic pressure cause action of the actuator, resulting in changes in an amount of a steering angle of the elevator, that is, upward and downward movements of a control surface. This causes an airframe to move up and down its nose, or pitch its nose, resulting in changes in an altitude H of the airframe.

In this embodiment, the instrument 2 may include an altimeter such as a radio altimeter. The instrument 2 makes measurement of a measured value of the altitude H of the airframe as the measured value regarding the behavior of the diagnosis target A. Hereinafter, the measured value of the altitude H is referred to as a measured value Hre. The measured value Hre measured by the instrument 2 may be inputted to the failure diagnostic device 3.

The measured value regarding the behavior of the diagnosis target A to be measured by the instrument 2 may include the altitude H of the airframe as described above, or may include a vertical speed of the airframe, i.e., a differential value of the altitude. Moreover, for example, the instrument 2 may include an acceleration sensor. In this case, time-integrating a measured value of the acceleration sensor makes it possible to calculate the vertical speed of the airframe. Further, time-integrating the vertical speed of the airframe makes it possible to calculate the altitude of the airframe.

The failure diagnostic device 3 may include, for example but not limited to, a computer. The failure diagnostic device 3 has the model M of the diagnosis target A.

Moreover, the failure diagnostic device 3 is supplied with the same input as an input to, for example, the hydraulic actuator of the diagnosis target A, e.g., the aircraft. For example, the failure diagnostic device 3 may be supplied with an amount of operation of the control device by the pilot, or an amount of displacement of the control rope. Though not illustrated, the failure diagnostic device 3 may further be configured to be supplied with data such as actual measurement data measured by various sensors and positional data from a satellite positioning system such as the GPS (Global Positioning System).

In this embodiment, the model M of the diagnosis target A may output an amount of change in the altitude H of the airframe, in a case where, for example, the amount of operation of the control device by the pilot, or the amount of displacement of the control rope, is inputted to the model M of the diagnosis target A.

That is, in aircrafts, the pilot operates the control device, or the control rope is displaced, causing the changes in the hydraulic pressure in the hydraulic actuator. This further causes the changes in the amount of the steering angle of the elevator, resulting in the corresponding changes in the altitude H of the airframe. The model M of this embodiments includes modelization of what is described above.

The failure diagnostic device 3 may be supplied with the amount of operation of the control device by the pilot, or the amount of displacement of the control rope, constantly or at predetermined time intervals.

Figure 2:
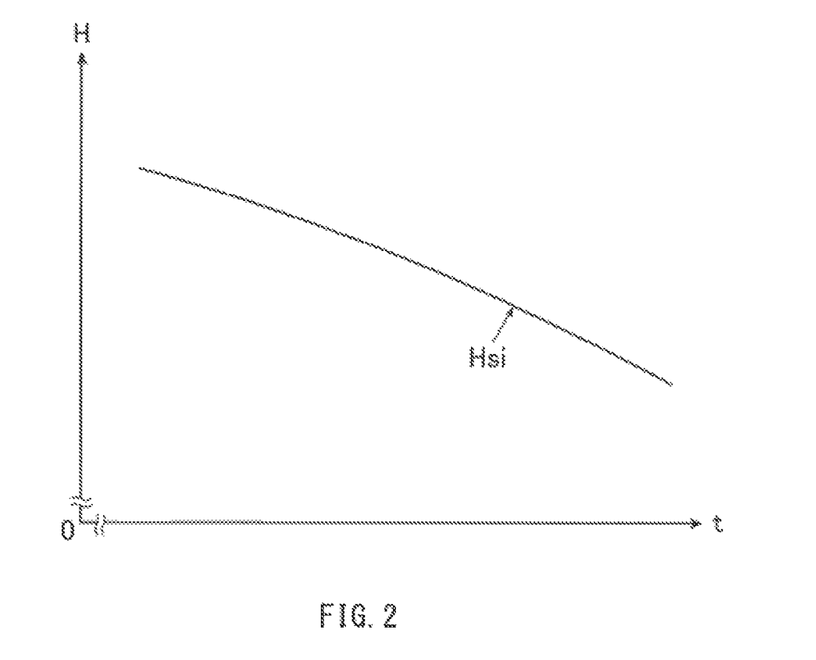
FIG. 2 is a graph illustrating of temporal transitions of an altitude of an airframe as an example of a result of simulation.

Supplied with, for example, the amount of operation of the control device, the failure diagnostic device 3 may input, for example, the amount of operation of the control device to the model M, allowing the model M to output the amount of change in the altitude H of the airframe. On the basis of the amount of change in the altitude H of the airframe thus outputted, the failure diagnostic device 3 may perform simulation of the altitude H of the airframe. In this case, as a result of the simulation, the failure diagnostic device 3 may be able to obtain temporal transitions of the altitude H of the airframe, for example, as illustrated in FIG. 2. Hereinafter, the altitude of the airframe as the result of the simulation is represented as an altitude Hsi.

As described above, in this embodiment, the failure diagnostic system 1 makes the failure diagnosis on the basis of the measured value Hre of the altitude H of the airframe and the altitude Hsi of the airframe. The measured value Hre of the altitude H of the airframe may serve as the measured value regarding the behavior of the diagnosis target A measured by the instrument 2. The altitude Hsi of the airframe may serve as the result of the simulation based on the model M.

As described above, there may be a slight time delay from the change in the amount of the steering angle of the elevator by the pilot operating the control device, to the corresponding change in the altitude of the airframe. Moreover, the airframe may be under an influence of an airflow. Thus, in many cases, the measured value Hre of the altitude H of the airframe does not become the same value as the altitude Hsi of the airframe as the result of the simulation.

In this embodiment, therefore, as described above, the failure diagnostic device 3 may diagnose that the diagnosis target A has no failure, in a case where a difference ΔH between the altitude Hsi of the airframe and the measured value Hre falls within a predetermined error range (hereinafter, referred to as a first error range). The altitude Hsi of the airframe may serve as the result of the simulation calculated with the model M supplied with the same input as the input to the diagnosis target A at the time of the measurement by the instrument 2 of the measured value regarding the behavior of the diagnosis target A, e.g., the measured value Hre of the altitude of the airframe. To be accurate, the difference ΔH is an absolute value of the difference, but hereinafter, simply referred to as the difference.

Figure 3A:
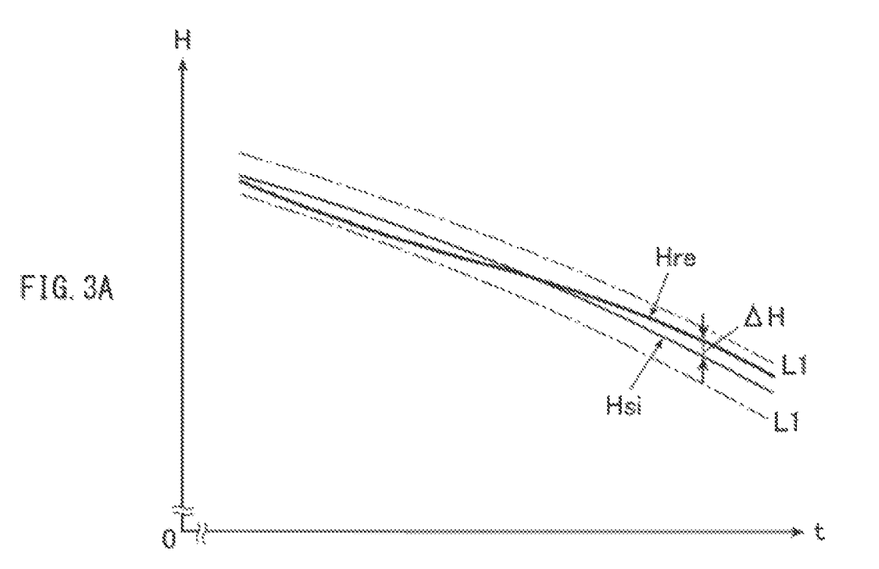
FIG. 3A is a graph illustrating examples of a measured value of the altitude of the airframe, the result of the simulation, and a first error range defined by one-dot chain lines.

The first error range may be represented, for example, as illustrated in FIG. 3A, by a range defined by one-dot chain lines L1 and L1 above and below the altitude Hsi of the airframe as the result of the simulation.

Further, in this embodiment, the failure diagnostic device 3 may diagnose that the diagnosis target A has a failure, in a case where the difference ΔH between the altitude Hsi of the airframe and the measured value Hre is greater than a predetermined error range (hereinafter referred to as a second error range). The altitude Hsi of the airframe may serve as the result of the simulation calculated as described above. The second error range may be set as a range wider than the first error range.

Figure 3B:
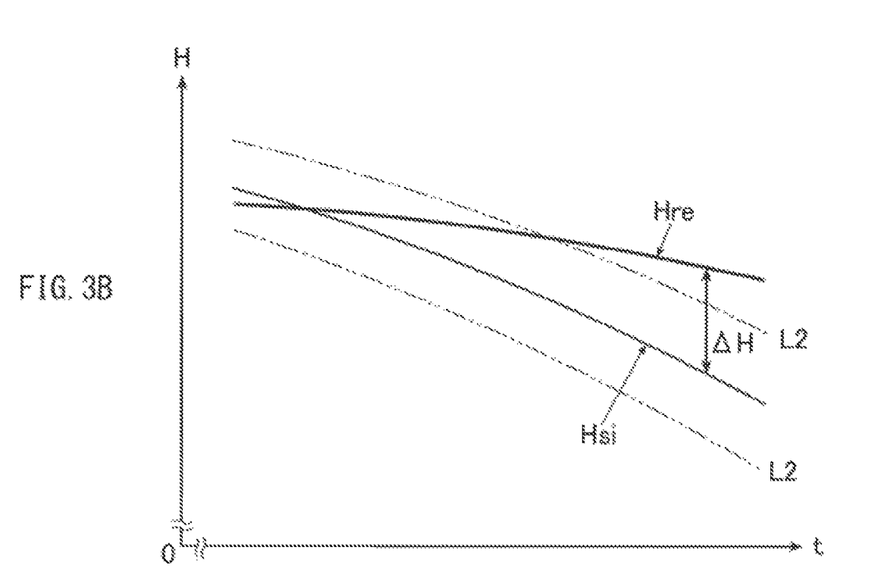
FIG. 3B is a graph illustrating examples of the measured value of the altitude of the airframe, the result of the simulation, and a second error range defined by two-dot chain lines.

The second error range may be represented, for example, as illustrated in FIG. 3B, by a range defined by two-dot chain lines L2 and L2 above and below the altitude Hsi of the airframe as the result of the simulation.

Figure 4:
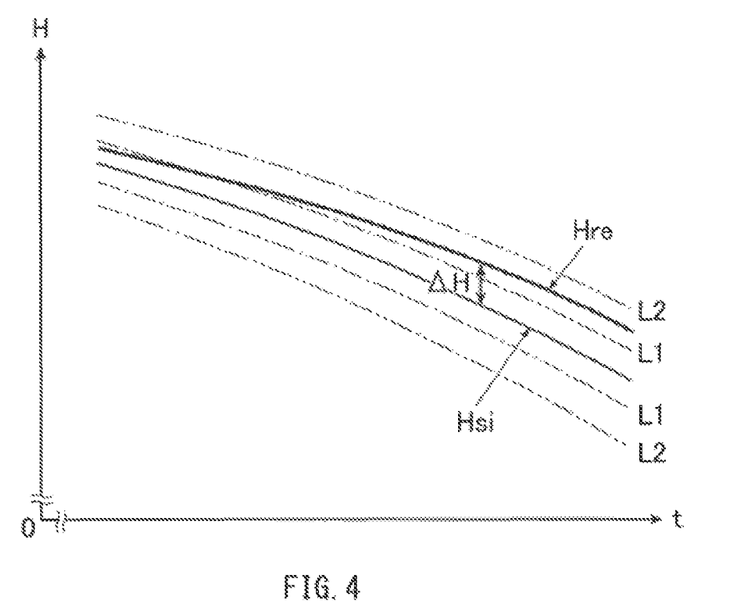
FIG. 4 is a graph illustrating by way of example a situation that a difference between the measured value regarding behavior of a diagnosis target and the result of the simulation is greater than the first error range but is smaller than the second error range.

Meanwhile, with the forgoing configuration, as illustrated in FIG. 4, the difference ΔH between the altitude Hsi of the airframe and the measured value Hre provides an insufficient basis to determine whether or not the diagnosis target A has the failure, in a case where the difference ΔH becomes greater than the first error range defined by the one-dot chain lines L1 and L1, but does not become greater than the second error range defined by the two-dot chain lines L2 and L2. The altitude Hsi of the airframe may serve as the result of the simulation calculated with the model M supplied with the same input as the input to the diagnosis target A at the time of the measurement by the instrument 2 of the measured value regarding the behavior of the diagnosis target A, e.g., the measured value Hre of the altitude of the airframe.

Accordingly, in such a case, the failure diagnostic device 3 offers a user, e.g., the pilot in this case, a proposal for execution of a special operation on the diagnosis target A, e.g., the aircraft, or a proposal for measurement of a new parameter related to the diagnosis target A.

The proposal may be displayed on a monitor provided in a cockpit, for example. Alternatively, the proposal may be delivered by sound or voice. The method of delivery of the proposal is not limited to displaying or voicing the proposal, and any method may be adoptable insofar as the proposal is delivered to the user, or the pilot.

Described below are the case of the execution of the special operation and the case of the measurement of the new parameter.

[Execution of Special Operation]

There may be a case where, for example, the pilot tilts the control stick forward as described above to operate the control device so as to lower the altitude H of the airframe, but the measured value Hre of the altitude of the airframe does not become as low as should have been as illustrated in FIG. 4. That is, there may be a case where the measured value Hre does not become as low as the altitude Hsi of the airframe as the result of the simulation. One of possible causes for this may be that the hydraulic pressure of the hydraulic actuator has failed to match with the operation of the control device, preventing the elevator from lowering to a predetermined steering angle.

In many cases, the hydraulic actuator of the elevator is configured to allow the pilot to be able to check the hydraulic pressure with a hydraulic gauge of the cockpit. But even if the hydraulic pressure of the hydraulic gauge, i.e., the hydraulic pressure at a source of supply of hydraulic oil, is normal, for example, clogging of piping near the hydraulic actuator may prevent the hydraulic pressure from becoming predetermined hydraulic pressure, which causes the state as illustrated in FIG. 4.

In such a case, as described above, the pilot may feel like their operation of the control device such as the control stick meets with a rather slow response from the behavior of the airframe.

A check may be made as follows, as to whether or not the hydraulic pressure of the hydraulic actuator failing to match with the operation of the control device constitutes the cause of the prevention of the measured value Hre of the altitude of the airframe from becoming as low as the altitude Hsi of the airframe as the result of the simulation, as illustrated in FIG. 4. For example, the pilot may be allowed to tilt the control stick forward significantly, to make an operation to cause a sudden descent of the airframe, and a check may be made as to whether or not the airframe accurately makes the sudden descent in response to the operation.

In this case, the operation for the pilot to cause the sudden descent of the airframe may serve as the special operation. The failure diagnostic device 3 offers the pilot the proposal to cause the sudden descent of the airframe. The proposal may be delivered, for example, by displaying the proposal on the monitor, or by voicing the proposal. It is to be noted that description is given below of the case with the sudden decent of the airframe, but an operation to cause a sudden ascent of the airframe may serve as the special operation.

Thus, the failure diagnostic device 3 may be configured to offer, as the special operation, an operation to cause an extreme action or a high-speed action of a suspected failed unit or part, within an allowable range. The term "allowable range" refers to an operation range within which the operation does not cause any progress of a suspected failure, nor cause any other failures, even if the suspected failure has actually occurred.

In this embodiment, upon the special operation being executed, the failure diagnostic device 3 may make a failure diagnosis on the basis of the measured value Hre of the altitude of the airframe measured by the instrument 2 at the time of the execution of the special operation and on the basis of the altitude Hsi of the airframe as the result of the simulation.

As a result of the execution of the special operation, in a case where, for example, the suspected failed unit or part performs an action as instructed, the failure diagnostic device 3 may diagnose that at least the relevant unit or part has no failure.

Meanwhile, as the result of the execution of the special operation, in a case where, for example, the suspected failed unit or part fails to perform the action as instructed, the failure diagnostic device 3 may diagnose that the relevant unit or part has a failure, and that it is the relevant failure that causes the failure in the diagnosis target A.

Figure 5:
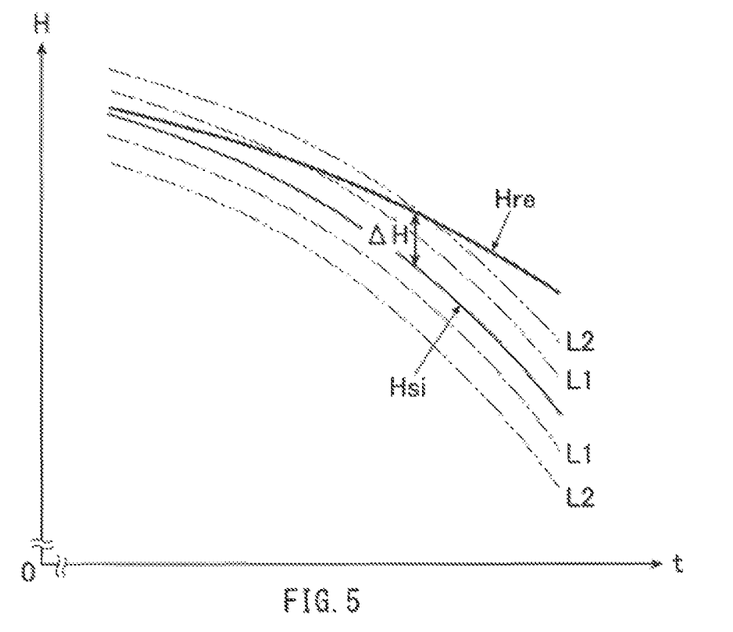
FIG. 5 is a graph illustrating by way of example a situation that in a case with a sudden descent of the airframe, the difference between the measured value of the altitude of the airframe and the result of the simulation becomes greater than the second error range.

That is, in the case with, for example, the operation to cause the sudden descent of the airframe, as illustrated in FIG. 5, if the measured value Hre of the altitude of the airframe does not become as low as the altitude Hsi of the airframe as the result of the simulation, causing the difference ΔH therebetween to be greater than the second error range defined by the two-dot chain lines L2 and L2, the failure diagnostic device 3 may diagnose that it is the failure in the hydraulic actuator that causes the failure in the diagnosis target A, e.g., the aircraft. The failure in the hydraulic actuator may include, for example, the clogging of the piping.

As described, in the failure diagnostic system 1 according to this embodiment, the failure diagnostic device 3 may make the failure diagnosis based on the actual behavior of the diagnosis target A and the result of the simulation based on the model M. The actual behavior of the diagnosis target A may include, for example, the measured value Hre of the altitude of the airframe. The result of the simulation based on the model M may include, for example, the altitude Hsi of the airframe. In the case where the difference ΔH between the measured value Hre of the altitude of the airframe and the altitude Hsi of the airframe is greater than the first error range, but is smaller than the second error range, the difference ΔH provides the insufficient basis to determine whether or not the diagnosis target A has the failure. In this case, the failure diagnostic device 3 offers the proposal for the execution of the special operation. In accordance with the proposal, for example, the pilot may execute the special operation. Hence, it is possible to diagnose whether or not the diagnosis target A, e.g., the aircraft, has the failure.

In the forgoing case, the failure diagnostic device 3 may solely offer the pilot, or the user, the proposal for the execution of the special operation. The failure diagnostic device 3 may be configured to allow the pilot themselves, or the user themselves, to execute the special operation in accordance with the proposal.

In one alternative, not only may the failure diagnostic device 3 offer the pilot, or the user, the proposal for the execution of the special operation, the failure diagnostic device 3 itself may also be configured to execute the special operation on the diagnosis target A in a case where the failure diagnostic device 3 receives the pilot's permission, or the user's permission, to execute the special operation.

In the case where the failure diagnostic device 3 is configured to execute the special operation (in the forgoing case, to cause the sudden descent), the failure diagnostic device 3 may be configured to, for example, give an instruction to an autopilot system of the aircraft to automatically cause the sudden descent of the airframe.

With the configuration of the failure diagnostic device 3 offering the proposal to execute the special operation as mentioned above, for example, there may be prepared in advance a comparison table and/or a database, without limitation, in which the special operations to be executed are associated with respective contents of the failures that may occur in the diagnosis target A, e.g., the aircraft. The failure diagnostic device 3 may be configured to refer to the comparison table and/or the database, without limitation, to determine which special operation to execute in accordance with the contents of the failure that may have occurred in the diagnosis target A.

Moreover, for example, in a case where the model M is represented by a matrix expression, the failure diagnostic device 3 may perform an inverse matrix of the matrix expression to specify the suspected failed unit or part, and to determine which special operation to execute on the relevant unit or part.

Furthermore, the failure diagnostic device 3 may be configured to offer a proposal for another special operation in a case where the special operation executed provides an insufficient basis to make a diagnosis as to whether or not the diagnosis target A, e.g., the aircraft, has the failure.

[Measurement of New Parameter]

The failure diagnostic device 3 may be configured to offer the user, e.g., the pilot in this case, the proposal for the measurement of the new parameter related to the diagnosis target A, in the case where the difference ΔH between the altitude Hsi of the airframe and the measured value Hre is greater than the first error range but is smaller than the second error range, as illustrated in FIG. 4, and the difference ΔH provides the insufficient basis to determine whether or not the diagnosis target A has the failure. The altitude Hsi of the airframe may serve as the result of the simulation calculated with the model M supplied with the same input as the input to the diagnosis target A at the time of the measurement by the instrument 2 of the measured value regarding the behavior of the diagnosis target A, e.g., the measured value Hre of the altitude of the airframe. The first error range may be defined by the one-dot chain lines L1 and L1, and the second error range may be defined by the two-dot chain lines L2 and L2.

For example, as mentioned above, in the case with a suspected decrease in the hydraulic pressure in the hydraulic actuator that causes the upward and downward movements of the elevator, or in the case with a suspected insufficient vertical movement of the elevator, the failure diagnostic device 3 may be configured to offer the pilot, or the user, a proposal to add an instrument to the diagnosis target A, e.g., the aircraft, to measure the new parameter such as the hydraulic pressure of the hydraulic actuator or the steering angle of the elevator. The instrument to be added may include, for example, a hydraulic pressure gauge and a sensor. The hydraulic pressure gauge may measure the hydraulic pressure of the hydraulic actuator. The sensor may detect the steering angle of the elevator. The proposal may be delivered, for example, by displaying the proposal on the monitor or voicing the proposal.

The failure diagnostic device 3 may be configured to make the failure diagnosis of the diagnosis target A on the basis of the measured new parameter, in a case where the new parameter is measured by the instrument added to the diagnosis target A, e.g., the aircraft, by the user, e.g., the pilot. The new parameter may be, for example, the hydraulic pressure p of the hydraulic actuator or the steering angle θ of the elevator. The instrument added to the diagnosis target A may include, for example, the hydraulic pressure gauge or the sensor.

With this configuration, it is possible for the failure diagnostic device 3 to check whether the hydraulic pressure p of the hydraulic actuator or the steering angle θ of the elevator matches with the operation by the user, e.g., the pilot, of the control device such as the control stick. It is possible to make an accurate diagnosis as to whether or not the hydraulic actuator of the elevator has the failure, and as to whether or not the relevant failure causes the failure in the diagnosis target A, e.g., the aircraft. The failure in the hydraulic actuator of the elevator may include, for example, the clogging of the piping.

In the case where the new parameter is measured, the failure diagnostic device 3 may be configured to revise the model M on the basis of the measured new parameter, and to perform the simulation based on the revised model, instead of, or concurrently with, making the failure diagnosis on the basis of the measured new parameter as mentioned above.

Description is given below by giving some specific but non-limiting examples.

For example, in a case where an outside air temperature is high, an actual amount of intake air into a jet engine of the aircraft becomes smaller, even if an apparent amount of the intake air into the jet engine of the aircraft is unchanged. This may hinder the jet engine from obtaining a predetermined thrust.

Figure 6A:
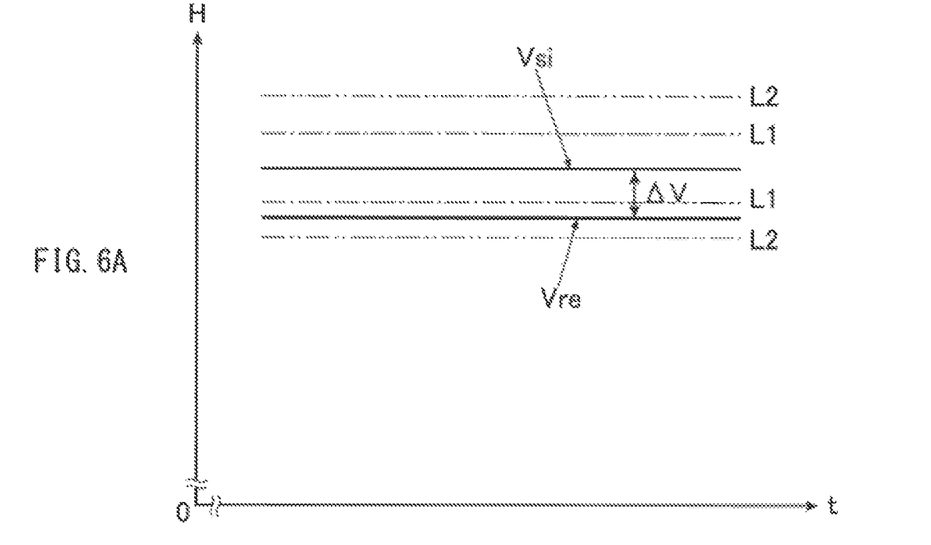
FIG. 6A is a graph illustrating examples of the result of the simulation based on a pre-revised model, the measured value of the altitude of the airframe, the first error range, and the second error range.

In this case, for example, in a case where simulation of a speed v of the aircraft is performed using the model M that assumes a sufficient amount of the intake air into the jet engine, there may be a case where a difference Δv between a speed vsi of the aircraft and a measured value vre is greater than the first error range defined by the one-dot chain lines L1 and L1, but is smaller than the second error range defined by the two-dot chain lines L2 and L2, for example, as illustrated in FIG. 6A, and the difference Δv provides an insufficient basis to determine whether or not the aircraft has the failure. The speed vsi of the aircraft may serve as the result of the simulation calculated with the model M supplied with the same input as the input to the diagnosis target A at the time of measurement by the instrument 2 of the measured value vre of the speed of the aircraft. The measured value vre may serve as the measured value regarding the behavior of the diagnosis target A.

In such a case, the failure diagnostic device 3 may allow a thermometer to be attached to an intake port of the jet engine of the aircraft, to make measurement of the outside air temperature T as the new parameter. The failure diagnostic device 3 may revise the model M on the basis of the measured outside air temperature T.

Figure 6B:
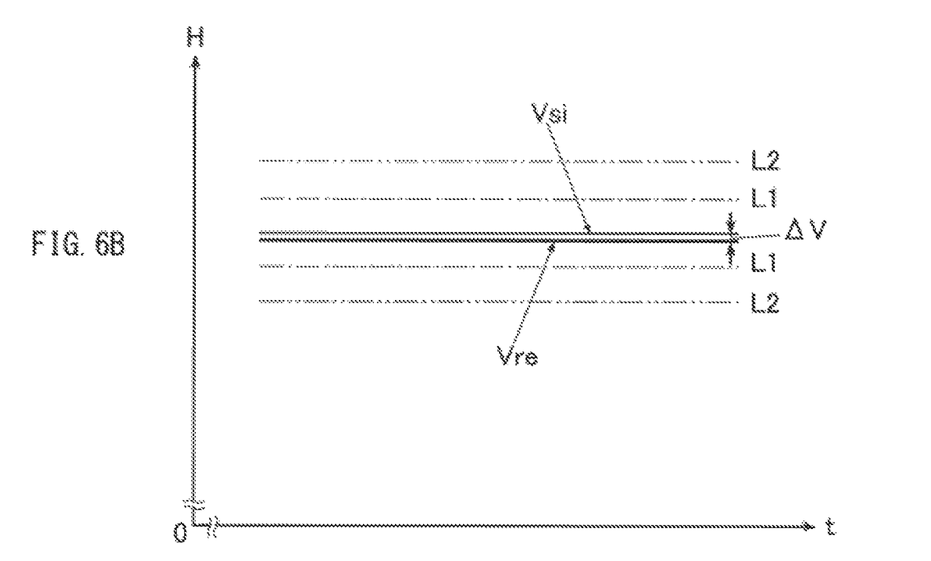
FIG. 6B is a graph illustrating examples of the result of the simulation based on a revised model, the measured value of the altitude of the airframe, the first error range, and the second error range.

Moreover, the failure diagnostic device 3 may covert, on the basis of the outside air temperature T as the new parameter, the amount of the intake air into the jet engine of the aircraft, i.e., the apparent amount of the intake air, into the actual amount of the intake air into the jet engine, to revise the model M. On the basis of the revised model M, the failure diagnostic device 3 may calculate the difference Δv between the measured value vre of the speed v of the aircraft and the result of the simulation vsi. In a case where the difference Δv falls within the first error range defined by the one-dot chain lines L1 and L1, for example, as illustrated in FIG. 6B, the failure diagnostic device 3 may diagnose that the jet engine has no failure, and that it is the outside air temperature that hinders the jet engine from obtaining the predetermined thrust.

In addition, though not illustrated, in a case where the difference between the result of the simulation based on the revised model M and the measured value measured by the instrument 2 is greater than the second error range described above, the failure diagnostic device 3 may diagnose that it is the failure in the jet engine that causes the failure in the diagnosis target A, e.g., the aircraft.

As described, the failure diagnostic device 3 may be configured to revise the model M on the basis of the measured new parameter, and perform the simulation based on the revised model M. Hence, it is possible to make a more accurate diagnosis as to whether or not the diagnosis target A, e.g., the aircraft, has the failure.

With the configuration of the failure diagnostic device 3 offering the proposal for the measurement of the new parameter as mentioned above, for example, there may be prepared in advance a comparison table and/or a database, without limitation, in which the new parameters to be measured are associated with respective contents of the failures that may occur in the diagnosis target A, e.g., the aircraft. The failure diagnostic device 3 may be configured to refer to the comparison table and/or the database, without limitation, to determine which new parameter to measure in accordance with the contents of the failure that may have occurred in the diagnosis target A.

Moreover, for example, with the configuration of the failure diagnostic device 3 revising the model M on the basis of the measured new parameter as mentioned above, there may be prepared in advance a corresponding relationship between the new parameters and items to be revised in the model M, or a corresponding relationship between the new parameters and the revised models M. The failure diagnostic device 3 may be configured to revise the model M on the basis of the corresponding relationship.

Furthermore, the failure diagnostic device 3 may be configured to offer a proposal for measurement of another new parameter in a case where the measurement of the new parameter provides an insufficient basis to make the diagnosis as to whether or not the diagnosis target A, e.g., the aircraft, has the failure.

[Effects]

As described, according to the failure diagnostic system 1 of this embodiment, the failure diagnostic device 3 is configured to offer the user, e.g., the pilot, the proposal for the execution of the special operation on the diagnosis target A or the proposal for the measurement of the new parameter related to the diagnosis target A, in the case where the difference between the result of the simulation, e.g., the altitude Hsi of the airframe, and the measured value, e.g., the measured value Hre of the altitude of the airframe, is greater than the predetermined error range, i.e., the first error range, but the difference provides the insufficient basis to determine whether or not the diagnosis target has the failure. The result of the simulation is calculated with the model M supplied with the same input as the input to the diagnosis target A at the time of the measurement by the instrument 2 of the measured value regarding the behavior of the diagnosis target A, e.g., the aircraft.

This makes it possible to perform the special operation on the diagnosis target A or to make the measurement of the new parameter related to the diagnosis target A, leading to a more accurate failure diagnosis, even in the case where the normal failure diagnosis based on the actual behavior of the diagnosis target, that is, the measured value, and the result of the simulation based on the model M is insufficient to determine whether or not the diagnosis target has the failure. Hence, it is possible to make a diagnosis as to whether or not the diagnosis target A has the failure.

In the forgoing embodiment, description is given separately of the case where the failure diagnostic device 3 offers the proposal for the execution of the special operation and the case where the failure diagnostic device 3 offers the proposal for the measurement of the new parameter. However, the failure diagnostic device 3 may offer the proposal for the measurement of the new parameter together with the execution of the special operation.

That is, for example, the failure diagnostic device 3 may offer a proposal to attach the thermometer to, for example, the air intake port of the jet engine, to measure, for example, the outside air temperature, and to cause the sudden descent. To measure, for example, the outside air temperature may serve as the measurement of the new parameter. To cause the sudden descent may serve as the execution of the special operation.

With such a configuration, it is possible to make a more accurate diagnosis as to whether or not the diagnosis target A has the failure.

Moreover, in the forgoing embodiment, description is given of the case where the failure diagnostic device 3 offers the proposal as described above, and thereafter, with the special operation executed and/or the new parameter measured, the failure diagnostic device 3 may perform the simulation based on the model M (inclusive of the revised model M) that assumes the diagnosis target A to have no failure.

However, for example, as in the forgoing example in which the hydraulic actuator of the elevator has the failure including the clogging of the piping, there may be a case where the constituent unit or part of the diagnosis target A is estimated to have the failure. The constituent unit or part may be, for example, the hydraulic actuator of the elevator, and the diagnosis target A may be, for example, the aircraft. In such a case, for example, the failure diagnostic device 3 may be configured to perform the simulation based on a model M* that assumes the failure in the constituent unit or part. In a case where the difference between the measured value and the result of the simulation falls within a predetermined error range, the failure diagnostic device 3 may diagnose that the constituent unit or part has the failure.

That is, for example, as illustrated in FIG. 5, in the case with the sudden descent of the airframe caused in accordance with the proposal of the failure diagnostic device 3, the failure diagnostic device 3 may make the failure diagnosis as follows. The failure diagnostic device 3 may create the model M* with the hydraulic actuator of the elevator having the failure. For example, the failure diagnostic device 3 may create the model M* with the clogging of the piping causing the hydraulic pressure of the actuator to drop below predetermined hydraulic pressure. In other words, the failure diagnostic device 3 may create the model M* that simulates the failure in the hydraulic actuator of the elevator. The failure diagnostic device 3 may be configured to perform the simulation based on the model M*.

Figure 7:
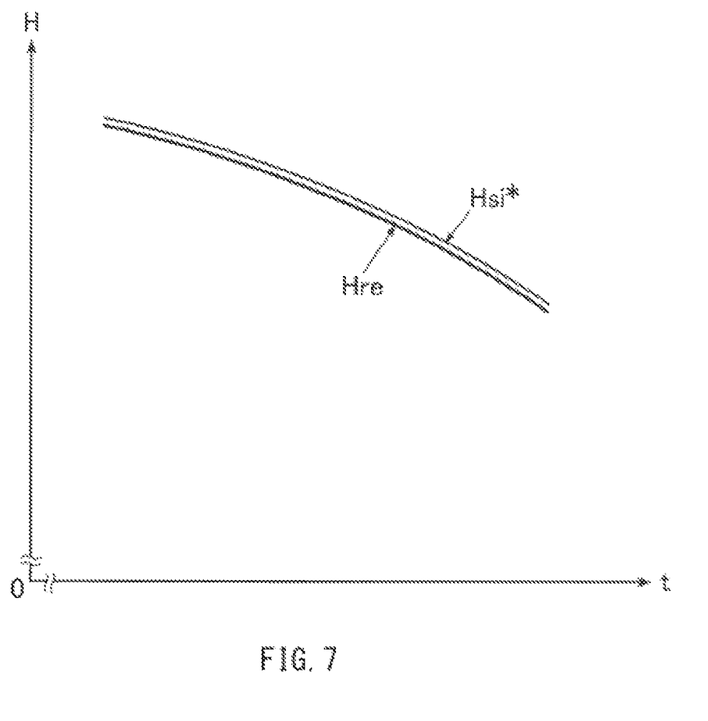
FIG. 7 is a graph illustrating examples of the result of the simulation based on a model that simulates a failure in a hydraulic actuator of an elevator, and the measured value of the altitude of the airframe.

Thus, as illustrated in FIG. 7, in a case where the difference ΔH between the result of the simulation Hsi* based on the model M* and the measured value Hre of the altitude of the aircraft falls within a predetermined error range, the failure diagnostic device 3 may diagnose that the hydraulic actuator of the elevator has the failure including, for example, the clogging of the piping. The model M* simulates the failure in the hydraulic actuator of the elevator.

As described, the failure diagnostic device 3 may be configured to make the failure diagnosis on the basis of the measured value measured at the time of the execution of the special operation and the result of the simulation based on the model M* that simulates the failure in the diagnosis target A. The measured value may be, for example, the measured value Hre of the altitude of the aircraft. The result of the simulation may be, for example, the result Hsi* of the simulation. The model M* may simulate, for example, the failure in the hydraulic actuator of the elevator. With this configuration as well, it is possible to make an accurate diagnosis as to whether or not the diagnosis target A or the constituent unit or part thereof has the failure.

It is to be noted that the technology is intended to include such a configuration.

Although some embodiments of the technology are described in detail by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

According to the technology, it is possible to make a diagnosis even in a case where a failure diagnosis based on actual behavior of a diagnosis target and a model-based simulation result is insufficient to determine whether or not the diagnosis target has a failure.

The failure diagnostic device 3 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the failure diagnostic device 3 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or apart of the functions of the failure diagnostic device 3 illustrated in FIG. 1.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

The invention claimed is:

1. A failure diagnostic system, comprising:
   an instrument configured to measure a value regarding behavior of a diagnosis target on which an operation is executed; and
   a failure diagnostic device having a model of the diagnostic target and configured to perform simulation based on the model using a same input as an input to the diagnosis target at a time the instrument measures the value regarding the behavior of the diagnosis target,
   wherein the failure diagnostic device determines a difference between a result of the simulation and the measured value,
   wherein when the difference is not greater than both of a first predetermined error range and a second predetermined error range, the failure diagnostic device determines that the diagnostic target has no failure, the second predetermined error range being greater than the first predetermined error range,
   wherein when the difference is greater than both of the first predetermined error range and the second predetermined error range, the failure diagnostic device determines that the diagnosis target has a failure, and
   wherein when the difference is greater than the first predetermined error range but smaller than the second predetermined error range, the failure diagnostic device determines that the result of the simulation and the measured value are insufficient to determine whether the diagnostic target has the failure and provides a proposal for executing an additional operation on the diagnostic target.

2. The failure diagnostic system according to claim 1, wherein the failure diagnostic device executes the additional operation on the diagnostic target on a condition that the failure diagnostic device receives a permission to execute the additional operation.

3. The failure diagnostic system according to claim 1, wherein when the difference is greater than the first predetermined error range but smaller than the second predetermined error range, the failure diagnostic device determines whether or not the diagnosis target has the failure, on a basis of the measured value measured by the instrument at a time of the execution of the additional operation and on a basis of the result of the simulation.

4. The failure diagnostic system according to claim 2, wherein when the difference is greater than the first predetermined error range but smaller than the second predetermined error range, the failure diagnostic device determines whether or not the diagnosis target has the failure, on a basis of the measured value measured by the instrument at a time of the execution of the additional operation and on a basis of the result of the simulation.

5. The failure diagnostic system according to claim 3, wherein
   the model includes a model that simulates the failure in the diagnosis target, and
   when the difference is greater than the first predetermined error range but smaller than the second predetermined error range, the failure diagnostic device determines whether or not the diagnosis target has the failure, on the basis of the measured value measured by the instrument at the time of the execution of the additional operation and on the basis of the result of the simulation based on the model that simulates the failure in the diagnosis target.

6. The failure diagnostic system according to claim 4, wherein
   the model includes a model that simulates the failure in the diagnosis target, and
   when the difference is greater than the first predetermined error range but smaller than the second predetermined error range, the failure diagnostic device determines whether or not the diagnosis target has the failure, on the basis of the measured value measured by the instrument at the time of the execution of the additional operation and on the basis of the result of the simulation based on the model that simulates the failure in the diagnosis target.

7. The failure diagnostic system according to claim 1, wherein when the difference is greater than the first predetermined error range but smaller than the second predetermined error range, the failure diagnostic device offers a proposal for measurement of a new parameter related to the diagnosis target, together with the execution of the additional operation on the diagnosis target.

8. The failure diagnostic system according to claim 2, wherein when the difference is greater than the first predetermined error range but smaller than the second predetermined error range, the failure diagnostic device offers a proposal for measurement of a new parameter related to the diagnosis target, together with the execution of the additional operation on the diagnosis target.

9. The failure diagnostic system according to claim 3, wherein when the difference is greater than the first predetermined error range but smaller than the second predetermined error range, the failure diagnostic device offers a proposal for measurement of a new parameter related to the diagnosis target, together with the execution of the additional operation on the diagnosis target.

10. The failure diagnostic system according to claim 4, wherein when the difference is greater than the first predetermined error range but smaller than the second predetermined error range, the failure diagnostic device offers a proposal for measurement of a new parameter related to the diagnosis target, together with the execution of the additional operation on the diagnosis target.

11. A failure diagnostic system, comprising:
an instrument configured to measure a value regarding behavior of a diagnosis target; and
a failure diagnostic device having a model of the diagnostic target and configured to perform simulation based on the model using a same input as an input to the diagnosis target at a time the instrument measures the value regarding the behavior of the diagnosis target,
wherein the failure diagnostic device determines a difference between a result of the simulation and the measured value,
wherein when the difference is not greater than both of a first predetermined error range and a second predetermined error range, the failure diagnostic device determines that the diagnostic target has no failure, the second predetermined error range being greater than the first predetermined error range,
wherein when the difference is greater than both of the first predetermined error range and the second predetermined error range, the failure diagnostic device determines that the diagnostic target has a failure, and
wherein when the difference is greater than the first predetermined error range but smaller than the second predetermined error range, the failure diagnostic device determines that the result of the simulation and the measured value are insufficient to determine whether the diagnostic target has the failure and provides a proposal for measurement of a new parameter related to the diagnosis target.

12. The failure diagnostic system according to claim 7, wherein on a condition that the measurement of the new parameter is made, the failure diagnostic device determines whether or not the diagnosis target has the failure, on a basis of the new parameter measured.

13. The failure diagnostic system according to claim 11, wherein on a condition that the measurement of the new parameter is made, the failure diagnostic device determines whether or not the diagnosis target has the failure, on a basis of the new parameter measured.

14. The failure diagnostic system according to claim 7, wherein on a condition that the measurement of the new parameter is made, the failure diagnostic device
revises the model on a basis of the new parameter measured, and
performs the simulation based on the revised model.

15. The failure diagnostic system according to claim 11, wherein on a condition that the measurement of the new parameter is made, the failure diagnostic device
revises the model on a basis of the new parameter measured, and
performs the simulation based on the revised model.

16. The failure diagnostic system according to claim 12, wherein on a condition that the measurement of the new parameter is made, the failure diagnostic device
revises the model on a basis of the new parameter measured, and
performs the simulation based on the revised model.

17. A failure diagnostic system, comprising:
an instrument configured to measuring a value regarding behavior of a diagnosis target on which an operation is executed; and
circuitry having a model of the diagnostic target and configured to perform simulation based on the model using a same input as an input to the diagnosis target at a time the instrument measures the value regarding the behavior of the diagnosis target,
wherein the circuitry determines a difference between a result of the simulation and the measured value,
wherein when the difference is not greater than both of a first predetermined error range and a second predetermined error range, the circuitry determines that the diagnostic target has no failure, the second predetermined error range being greater than the first predetermined error range,
wherein when the difference is greater than both of the first predetermined error range and the second predetermined error range, the circuitry determines that the diagnosis target has a failure, and
wherein when the difference is greater than the first predetermined error range but smaller than the second predetermined error range, the circuitry determines that the result of the simulation and the measured value are insufficient to determine whether the diagnostic target has the failure and provides a proposal for executing an additional operation on the diagnostic target.

18. A failure diagnostic system, comprising:
an instrument configured to measure a value regarding behavior of a diagnosis target; and
circuitry having a model of the diagnostic target and configured to perform simulation based on the model using a same input as an input to the diagnosis target at a time the instrument measures the value regarding the behavior of the diagnosis target,
wherein the circuitry determines a difference between a result of the simulation and the measured value,
wherein when the difference is not greater than a first predetermined error range and a second predetermined error range, the circuitry determines that the diagnostic target has no failure, the second predetermined error range being greater than the first predetermined error range,
wherein when the difference is greater than both of the first predetermined error range and the second predetermined error range, the circuitry determines that the diagnosis target has a failure, and
wherein when the difference is greater than the first predetermined error range but smaller than the second predetermined error range, the circuitry determines that the result of the simulation and the measured value are insufficient to determine whether the diagnostic target has the failure and provides a proposal for measurement of a new parameter related to the diagnosis target.

* * * * *